United States Patent [19]

Listing

[11] Patent Number: 4,719,382
[45] Date of Patent: Jan. 12, 1988

[54] DIRECT-CURRENT MOTOR

[76] Inventor: Volkmar Listing, Nestroystrasse 10, D-8070 Ingolstadt, Fed. Rep. of Germany

[21] Appl. No.: 866,454

[22] Filed: May 22, 1986

[30] Foreign Application Priority Data

Jun. 13, 1985 [DE] Fed. Rep. of Germany ....... 3521241

[51] Int. Cl.$^4$ .............................................. H02K 1/12
[52] U.S. Cl. .................................... 310/187; 310/177; 310/185; 310/216; 310/259
[58] Field of Search .................. 310/46, 177, 172, 182, 310/208, 185, 186, 187, 188, 189, 179, 180, 254, 258, 259, 216, 218, 217

[56] References Cited

U.S. PATENT DOCUMENTS

| 697,783 | 4/1902 | Berg | 310/218 |
| 706,017 | 8/1902 | Burke | 310/218 |
| 1,363,167 | 12/1920 | Peugot | 310/187 |
| 1,881,394 | 10/1932 | Aull | 310/187 |
| 3,600,801 | 8/1971 | Larsen | 310/208 |

FOREIGN PATENT DOCUMENTS 164617 4/1904 Fed. Rep. of Germany .
325599 2/1930 United Kingdom .

Primary Examiner—R. Skudy

[57] ABSTRACT

The invention generally concerns a DC motor with an armature, several poles and with field coils surrounding said poles. According to the instant invention, each pole includes two pole halves which are displaced from each other in the peripheral sense by a given distance. Pole halves belonging to a given pair are connected to each other by a common pole shoe so that each pole is approximately U-shaped in its radial cross-section with the legs of the U (the pole halves) pointing outwardly. Each pole half is individually surrounded by its own field coil. In general, the principle of the invention is that the pole of a classic DC motor is split in two and that the thus obtained pole halves are displaced symmetrically relative ends of the pole shoe. In this manner, a shorter yoke length $L_{js}$, together with lower magnetomotive force in ampere-windings than in a classic DC motor are made possible. Furthermore, a lower coil resistance is obtained, i.e. for identical current consumption there is a lower production of loss heat. The lower number of ampere-windings results in further reduction of the number of windings for an identical current. Hence, the range of applications for a DC motor according to the invention of a given size is broader than for a classic DC motor.

5 Claims, 5 Drawing Figures

FIG. 2
PRIOR ART
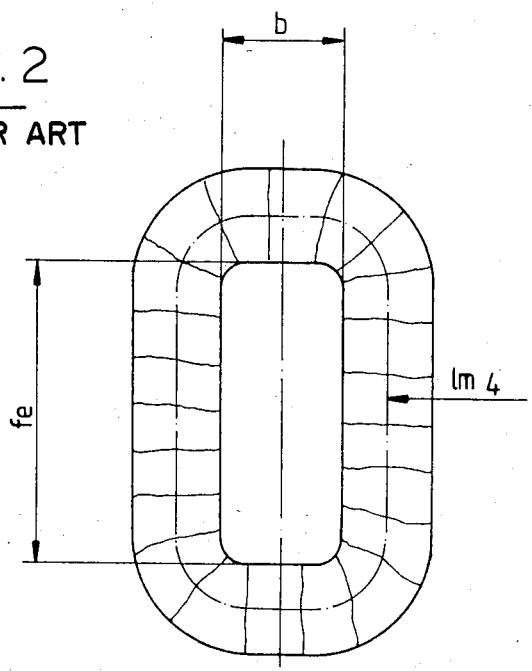
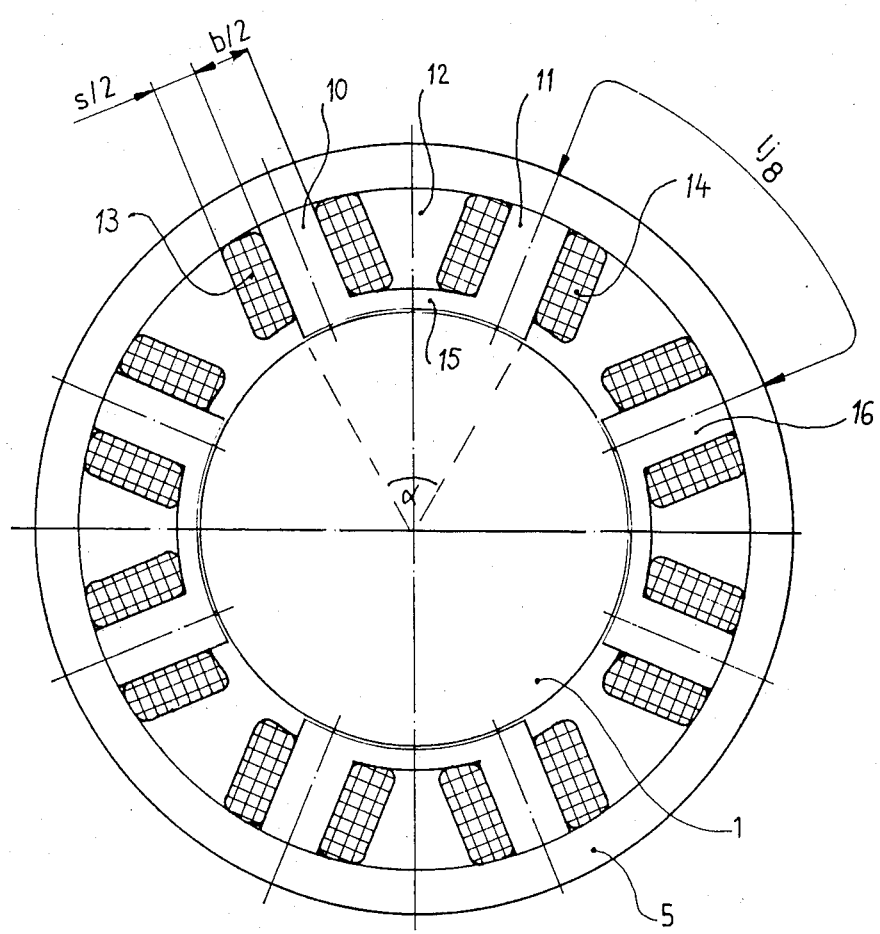
FIG. 3

DIRECT-CURRENT MOTOR

BACKGROUND OF THE INVENTION

The invention concerns a DC motor in general, and in particular a DC motor with an armature with several poles and with pole shoes on the armature side, such pole shoes being connected to the poles.

A known, classic DC motor consists of a rotatable, cylindrical armature, of stationary poles with pole shoes and field coils and of a cylindrical yoke. The pole shoes are widenings on the armature side, i.e. they are continuations on either side of the pole in radial cross-section, whereby the field coils are installed in the interval formed between pole shoe and yoke.

In designing a DC motor, it is important to provide for optimal magnetic ratios. In addition to the ratios of the teeth in the armature, the ratios in the yoke are equally critical and the magnetomotive force is considerably great. Assuming, for example, that the yoke thickness is 50% of the pole arc and that the yoke thickness is about 50% of the pole width, the resulting induction in the yoke will be four times higher with regards to the air gap, and the magnetomotive force will be correspondingly great.

The given space and the required number of windings in the field coils determine the ohmic resistance and therefore also the ohmic resistance losses to a great extent, just as they determine the surface of the field coils and therefore, the temperatures produced in function of the ohmic resistance losses. On the whole, this means that the application of a DC motor is essentially determined by its size, since capacity and limits of excess temperature are determined by said size within relatively narrow limits. As described above, this is based on the geometry of the poles and of the pole shoes such as they have been used in the past, as well on the resulting geometry of the field coils.

In a known DC motor with armature, poles and field coils (DE-PS No. 164 617) each pole consists of two halves which are displaced from each other by a space, in the peripheral sense, and whereby each pole half is surrounded by its own field coil. A division of a pole into several poles with the same number of windings is thus created, resulting in reduction of the electrical time constant. There are no pole shoes in this design.

For another known DC generator (GB-PS No. 325 599) partial poles, sharing a pole shoe are disclosed, whereby the pole halves with the pole shoe are approximately U-shaped in radial cross-section. This design features varying air gaps per diametrical half so that constant voltage may be attained with varying charges.

By contrast, the instant invention has as its objective to reduce the required magnetic potential different in amper-windings for a DC motor of a given size, and to reduce at the same time the ohmic resistance of the field coils while increasing the loss heat radiataing surface of the field coils.

This objective may be attained with a DC motor of the type generally described in the first paragraph above, and with the characteristics described hereinbelow.

According to one exemplary embodiment in accordance with this invention, each pole consists of two pole halves which are displaced in the peripheral sense to each other by a space. The pole halves are connected in pairs, each pair by a common pole shoe, so that each pole, in its radial cross-section, is approximately U-shaped whereby the pole halves (the legs of the U) are pointing out radially. Each of the pole halves is surrounded by a field coil of its own, so that two field coils working together are provided for each pole.

In such a design the yoke length is shortened and thereby the required magnetomotive force in the number of amper windings is reduced. By splitting the poles found in a classic DC motor and by reducing the number of windings, the ohmic resistance of the field coils is reduced, and so is the developing loss heat. This is important in continuous operation as well as in overload operation since the range of applications is basically determined by defined temperature limits.

By changing the geometric arrangement of the field coils, the surface of the coils is also increased, resulting in greater radiation of loss heat so that the developing temperatures are further lowered.

By splitting the poles and by distributing the field coils two per pole, beter use is made of the winding space and the manufacture of the coils is simplified.

Thus, the DC motor according to the invention stands out when compared with known motors in that the range of application possibilities for a given motor size is broadened, or in that the entire motor can be made smaller for given application conditions. This is necessary and desirable in a great number of cases. Yet the DC motor still remains simple in construction and inexpensive in manufacture.

According to another aspect of this invention, the distance between the two connected pole halves of the same pair should be equal to the distance to the next pole half of the next pole. This has the advantage of a symmetric arrangement of all pole parts.

According to still another aspect of this invention, it is advantageous for the number of windings of the field coils of the two pole halves to be approximately equal to the number of windings that would be used on only one field spool for a pole combining these pole halves into one single pole.

More detailed information on the invention is presented in the example of an embodiment of the invention.

BRIEF DESCRIPTION OF THE DRAWINGS

FIG. 2 shows a top view of a field coil of the DC motor of FIG. 1.

FIG. 3 shows a stylized cross-section of a DC motor according to the present invention.

DESCRIPTION OF THE FURTHER BACKGROUND

Figure 1:
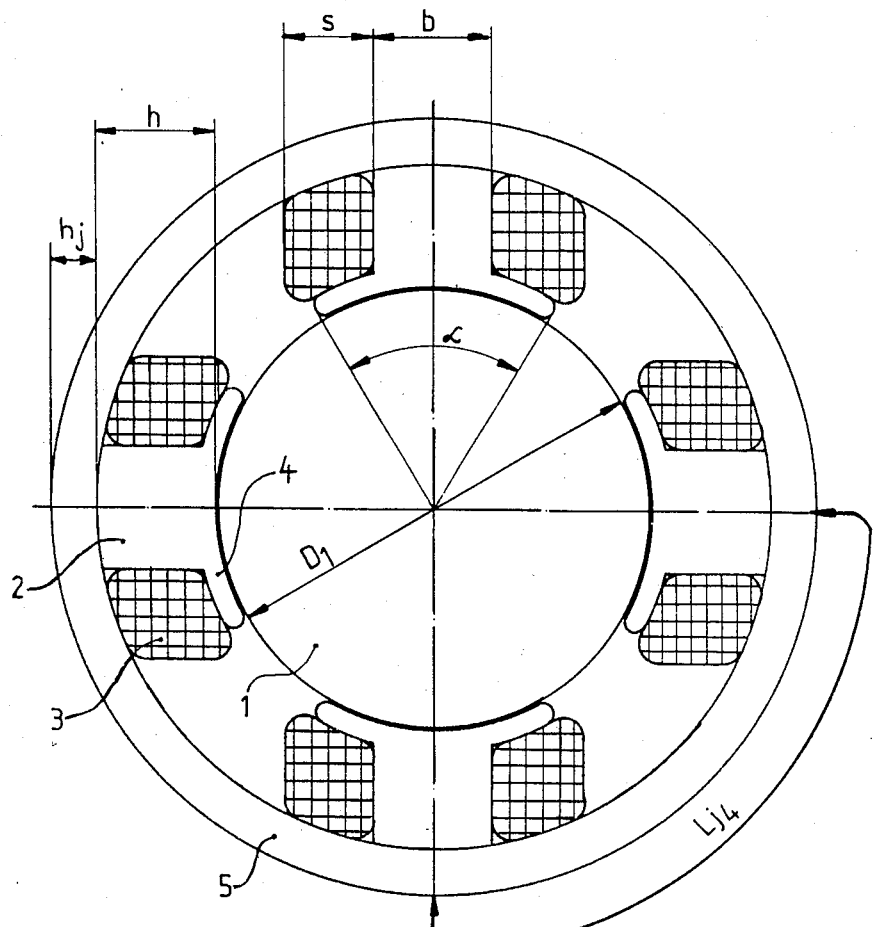
FIG. 1 shows a stylized cross-section of a classic (i.e. prior art) DC motor.

FIG. 1 shows a cross-section through a prior art DC motor with an armature 1, four poles 2 and field coils 3 on these poles 2, as well as pole shoes 4 and yoke 5. The drawing is that of a classic motor in which the pole shoes 4 widen on the armature side so that pole 2 becomes T-shaped. Pole arc $a$, i.e. the angle zone from one pole shoe end to the other, is 60° in this embodiment. The pole width $b$ is approximately 50% of the pole arc and the yoke thickness $h_j$ is approximately 50% of the pole width $b$. The four poles are arranged symmetrically or are displaced by 90° each, so that the resulting yoke length $L_{j4}$ (the subscript 4 indicates an embodiment with 4 poles) is ¼ of the yoke circumference or 90° of the yoke arc. The pole height is h and the armature diameter is $D_1$.

A field coil 3 surrounds each pole 2. It is shown in greater detail in the top view of FIG. 2. Pole 2 as well as coil 3 are of rectangular shape in top view, whereby the shorter side of the rectangle in the interior cross-section of the field coil reproduces the pole width b and the larger side reproduces the iron length or pole length fe. The broken line in FIG. 2 represents the mean winding length $lm_4$. The cross-sectional shape and the coiled width s of the field coils 3 can be recognized in FIG. 1.

DESCRIPTION OF PREFERRED EMBODIMENT

FIG. 3 shows a cross-section of a DC motor according to the invention. Armature 1 and yoke 5 have been left unchanged and are as those of the classic DC motor of FIG. 1, as is the pole arc $\alpha$. Each pole 2, however, is split and the two pole halves 10, 11 are displaced toward the ends of the pole shoe 4. As a result each pole is U-shaped in cross-section, this shape being formed by the pole halves 10, 11 and by pole shoe 15 which integrally connects them. In cross-section, the pole halves 10, 11 are of rectangular shape with the middle lines extending radially. The pole halves 10, 11 are separated from each other by a space 12 which has the form of a longitudinal split. Thus, pole halves 10, 11 have a width of only b/2.

A field coil 13, 14 again surrounds each pole half 10, 11, but said field coil, compared with the classic design, has a coil width of only s/2.

Figure 4:
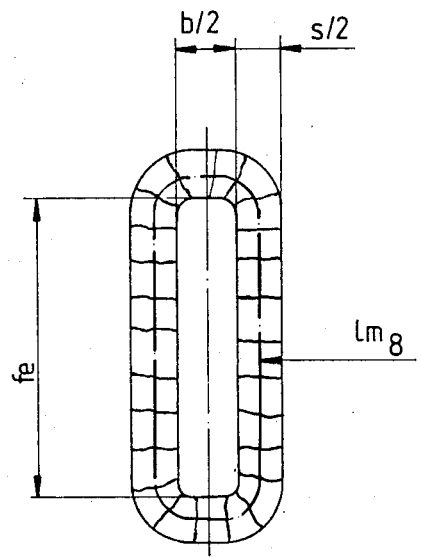
FIG. 4 shows a top view of a field coil of the DC motor of FIG. 3.

The coil shape for the DC motor of FIG. 3 is shown in detail in a single coil in FIG. 4. It can be seen here that the iron length or pole length fe has remained the same here, but that the pole width b and the spool width s are halved and that the mean winding length $lm_8$ (the subscript 8 indicating that 8 coils are used in this embodiment according to the invention) has been reduced.

In FIG. 3, the yoke length becomes $l_{j8}$, i.e. the mean distance between two non-connected pole halves is 45°.

Figure 5:
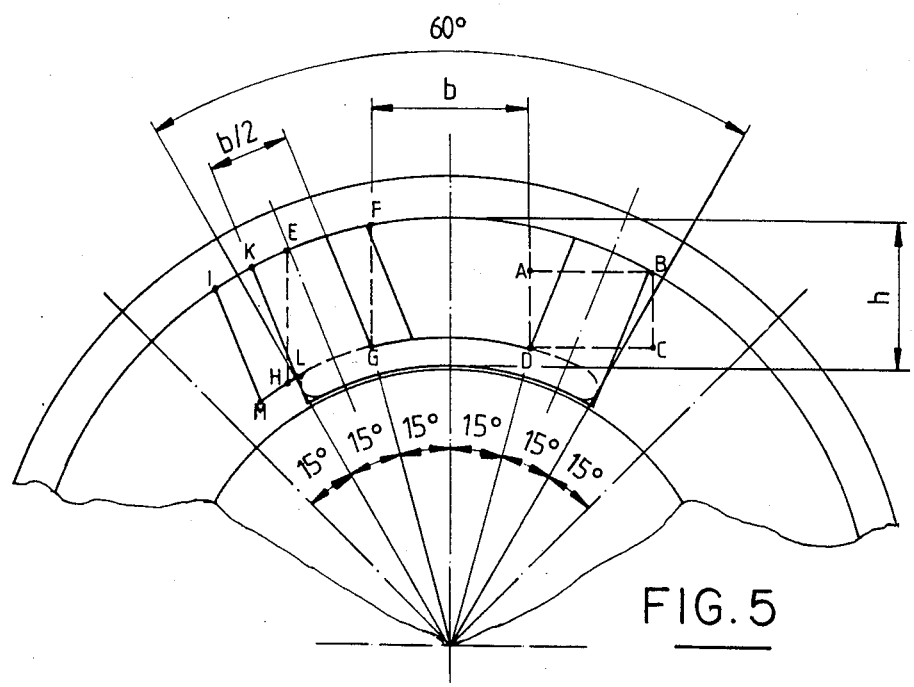
FIG. 5 shows a schematic cross-section with poles of both classic and inventive type, in order to clarify dimensions.

In FIG. 5, the classic configuration of a pole and the configuration according to the invention have been drawn on top of each other. In the classic version, the pole width is again designated by b. The resulting coil forms, for the classic version, are shown in cross-section by the drawn rectangles A-B-C-D or E-F-G-H.

With the inventive arrangement, with pole width b/2 (offset by 22.5°) on the other hand, the resulting coil configuration is I-K-L-M. It clearly makes better use of available space than A-B-C-D.

The following are a few dimensional relationships between a DC motor according to the invention and a classic DC motor, whereby the size relationships shown in the illustrations are used as an approximate basis (the subscript 8 again corresponds to the DC motor according to the invention, while subscript 4 designates the classic DC motor):

(a) Yoke length relation:
$l_8/l_4$ = approx. 0.60 to 0.68
(b) Relationships between coil resistances:
$lm_8$ = 0.786 for fe = 4b; b = s
$lm_8$ = 0.70 for fe = 2b; b = s
(c) Relationships between coil resistances:
$R_8/R_4$ = approximately 0.7 to 0.786, depending upon parameter relationships as in (b)
(d) Relationships of spool surfaces:
$O_8/O_4$ = approx. 1.05 to 1.178, depending on parameter relationships as in (b)

From these examples it can be clearly seen once again that the design according to invention, with split pole halves (subscript 8) results in shorter yoke length, in combinations with lower magnetic motive force in the ampere-windings. A further result is lowered coil resistance, i.e. lower loss heat with identical current consumption. The reduced number of ampere windings results in even further reduction of the number of windings with the same current and the surface of the coils in the split embodiment can be increased by up to approximately 18%, thus reducing heating of the motor.

In the above example an embodiment with 4 poles was chosen, but similar advantages are obtained in an embodiment with n poles.

To sum up, it has been found that the instant invention creates a DC motor with a greater range of applications for a given size.

What is claimed is:

1. A DC motor having a common cylindrical armature for responding to symmetrical magnetic fields for rotation of same, said motor further comprising a predetermined number of poles with pole shoes on the armature side thereof, said pole shoes being integrally connected to said poles, and each pole including two pole halves separated from each other in the peripheral sense by a predetermined space, with each such pole half being surrounded by its own individual field coil and said pole halves of a given pair being integral with a common pole shoe so that each pole is approximately U-shaped in its radial cross-section, whereby the legs of such U point radially outward from said armature;
whereby the overall size of said motor is reduced for a given application thereof by reducing the ohmic resistance of the individual field coils while increasing the surface area thereof to reduce heating of said motor.

2. A DC motor as in claim 1, wherein said predetermined space between said two pole halves of a given pair thereof is equal to the distance between adjacent of said pole halves not of a given pair.

3. A DC motor as in claim 1, wherein the total number of winding in field coils on two pole halves of a given pair of same are approximately equal to the number of windings that would otherwise normally be used for one single pole made up from a given pair of said pole halves.

4. A DC motor as in claim 1, wherein said predetermined number of poles is four, and a resulting motor incorporating said given pairs of pole halves with said predetermined space therebetween, respectively, has a shorter yoke length therefor than a motor which does not incorporate said pole halves.

5. A DC motor as in claim 3 wherein the number of windings on respective pole halves in a given pair of same are approximately equal.

* * * * *